(12) United States Patent
Chase et al.

(10) Patent No.: US 10,361,017 B2
(45) Date of Patent: Jul. 23, 2019

(54) ELECTRICAL ISOLATOR

(71) Applicant: Crompton Technology Group Limited, Solihull West Midlands (GB)

(72) Inventors: Ian Thomas Chase, Charfield (GB); Darcy John O'Gara, Banbury (GB); Miguel Diaz Palacios, Oxford (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 269 days.

(21) Appl. No.: 15/286,243

(22) Filed: Oct. 5, 2016

(65) Prior Publication Data

US 2017/0103832 A1  Apr. 13, 2017

(30) Foreign Application Priority Data

Oct. 8, 2015 (EP) ..................................... 15275212

(51) Int. Cl.
| | |
|---|---|
| *H01B 17/34* | (2006.01) |
| *B64D 45/02* | (2006.01) |
| *H01B 13/26* | (2006.01) |
| *F16L 25/01* | (2006.01) |
| *H01B 1/04* | (2006.01) |

(Continued)

(52) U.S. Cl.
CPC ............ *H01B 17/34* (2013.01); *B64D 45/02* (2013.01); *F16L 25/01* (2013.01); *H01B 1/04* (2013.01); *H01B 3/08* (2013.01); *H01B 3/48* (2013.01); *H01B 13/26* (2013.01)

(58) Field of Classification Search
None
See application file for complete search history.

(56) References Cited

U.S. PATENT DOCUMENTS

| 4,089,455 A | 5/1978 | Fellers | |
|---|---|---|---|
| 4,400,019 A * | 8/1983 | Fruck | F16L 25/00 264/35 |

(Continued)

FOREIGN PATENT DOCUMENTS

DE  4124967 A1  1/1993

OTHER PUBLICATIONS

European Search Report for Application No. 15275212.7-1754. 9 pages, dated Apr. 14, 2016.

*Primary Examiner* — Dimary S Lopez Cruz
(74) *Attorney, Agent, or Firm* — Cantor Colburn LLP

(57) ABSTRACT

There is described an electrical isolator comprising a first fluid-carrying member and a second fluid-carrying member spaced apart from said first fluid-carrying member, a resistive, semi-conductive or non-conductive component located between and sealed against said first and second fluid-carrying member, wherein said resistive, semi-conductive or non-conductive component is adapted to convey fluid flowing from said first fluid-carrying member to said second fluid-carrying member, a reinforcing composite encircling said first fluid-carrying member, said second fluid-carrying member and said resistive, semi-conductive or non-conductive component, wherein said reinforcing composite is continuous and provides a conductive path between said first fluid-carrying member and said second fluid-carrying member, wherein said reinforcing composite comprises fiber and a resin mixture, and said resin mixture comprises resin and a conductive additive.

12 Claims, 1 Drawing Sheet

(51) Int. Cl.
*H01B 3/08* (2006.01)
*H01B 3/48* (2006.01)

(56) References Cited

U.S. PATENT DOCUMENTS

| | | | | |
|---|---|---|---|---|
| 4,654,747 | A * | 3/1987 | Covey | F16L 25/03 361/215 |
| 5,634,672 | A * | 6/1997 | Stack | B21D 22/105 156/158 |
| 8,947,846 | B2 * | 2/2015 | Courpet | B64D 45/02 361/215 |
| 9,857,003 | B2 * | 1/2018 | Bouey | F16L 9/147 |
| 2009/0102187 | A1 * | 4/2009 | Carns | F16L 25/01 285/123.15 |
| 2012/0326433 | A1 | 12/2012 | Rorabaugh et al. | |
| 2012/0326434 | A1 * | 12/2012 | Cohen | B29C 70/205 285/50 |

* cited by examiner

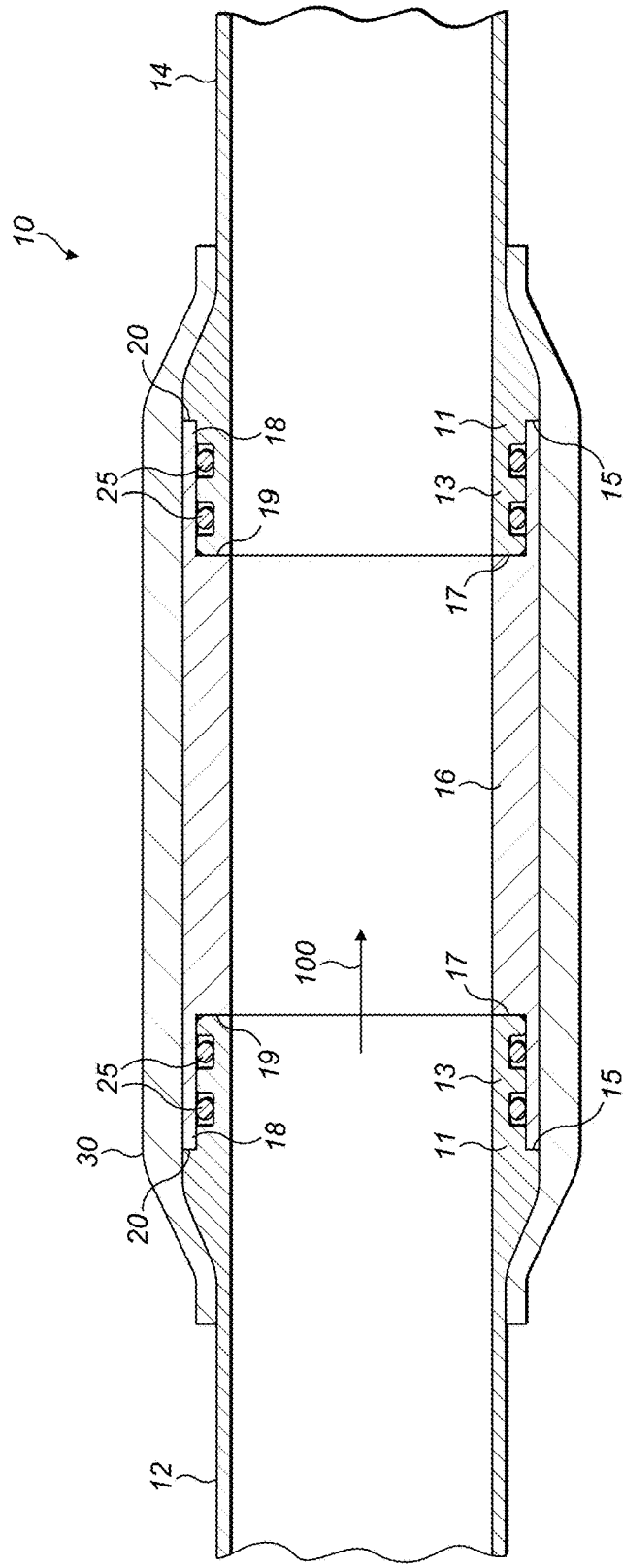

ELECTRICAL ISOLATOR

FOREIGN PRIORITY

This application claims priority to European Patent Application No. 15275212.7 filed Oct. 8, 2015, the entire contents of which is incorporated herein by reference.

FIELD

The present disclosure relates generally to an electrical isolator, and more specifically to an electrical isolator for use in a hydraulic fluid line for an aircraft. The electrical isolator may be used for connecting two fluid-carrying members such as pipes, hoses or tubes, for example pipes conveying hydraulic fluid.

BACKGROUND

Aircraft and other vehicles contain a large number of fluid conveying systems, in particular hydraulic systems that comprise fluid conveying components such as pipes. Such components are typically metallic and have good electrical conductivity.

Devices are incorporated into such systems to form electrical isolators between its metallic components. These isolators prevent build-up of electrostatic charge by safely dissipating static build up, and also prevent excessive electrical current flowing through the system, for example due to a lightning strike. Both of these events may cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

SUMMARY

In accordance with an aspect of the disclosure, there is provided an electrical isolator comprising: a first fluid-carrying member or pipe and a second fluid-carrying member or pipe spaced apart from the first fluid-carrying member; a resistive, semi-conductive or non-conductive component located between and sealed against the first and second fluid-carrying member, wherein the resistive, semi-conductive or non-conductive component is adapted to convey fluid flowing from the first fluid-carrying member to the second fluid-carrying member; a reinforcing composite encircling the first fluid-carrying member, the second fluid-carrying member and the resistive, semi-conductive or non-conductive component, wherein the reinforcing composite is continuous and may provide a conductive path between the first fluid-carrying member and the second fluid-carrying member; wherein the reinforcing composite comprises fibre and a resin mixture, and the resin mixture comprises resin and a conductive additive.

The above isolator uses a reinforcing composite encircling the first fluid-carrying member, second fluid-carrying member and non-conductive component, whilst providing a conductive path through the reinforcing composite, but not the component sealing the two fluid-carrying members. This provides a device that effectively dissipates charge build-up and electrically isolates the junction between two fluid-conveying devices, whilst providing a strong joint to withstand high pressures.

In accordance with an aspect of the disclosure, there is provided a method of forming one or more electrical isolators, the method comprising: connecting a first fluid-carrying member to a second fluid-carrying member using a resistive, semi-conductive or non-conductive component; sealing the resistive, semi-conductive or non-conductive component against the first and second fluid-carrying member such that the resistive, semi-conductive or non-conductive component is able to convey fluid flowing from the first fluid-carrying member to the second fluid-carrying member; winding a fibre and resin mixture around the first fluid-carrying member, the resistive, semi-conductive or non-conductive component and the second fluid-carrying member so as to encircle the first fluid-carrying member, the second fluid-carrying member and the resistive, semi-conductive or non-conductive component, wherein the resin mixture comprises resin and a conductive additive; and curing the fibre and resin mixture.

This method provides a simple and effective way of sealing and electrically isolating two fluid-carrying members. Winding the fibre and resin mixture around the members and the resistive, semi-conductive or non-conductive component results in a tight and structurally sound reinforcement of the various parts.

The fibre and resin mixture may be wound directly onto the first fluid-carrying member, the resistive, semi-conductive or non-conductive component and the second fluid-carrying member. The method may comprise applying a surface treatment, for example a conductive surface treatment to the first and second fluid-carrying members, and the fibre and resin mixture may be wound directly onto the surface treatment of the first fluid-carrying member, the resistive, semi-conductive or non-conductive component and the second fluid-carrying member. By "directly onto" it is meant that no other material is present between the first fluid-carrying member, the resistive, semi-conductive or non-conductive component, the second fluid-carrying member and the fibre and resin mixture.

The method may further comprise drawing a fibre through a resin bath to form the fibre and resin composite.

In any of the aspects of embodiments described herein, the first fluid-carrying member and the second fluid-carrying member may be configured to carry or convey fluid, and are not limited to any specific geometry or cross-section.

The reinforcing composite encircles the first and second fluid-carrying members, but typically just the end portions thereof, e.g. closest to the resistive, semi-conductive or non-conductive component. The reinforcing composite may be a continuous tube that extends from the first fluid-carrying member (or an end portion thereof) and over the resistive, semi-conductive or non-conductive component to the second fluid-carrying member (or an end portion thereof).

The reinforcing composite may have a varying cross-sectional area and/or inner diameter and/or outer diameter. Alternatively, the reinforcing composite may have a constant or substantially constant cross-sectional area and/or inner diameter and/or outer diameter and/or thickness. The cross-sectional area of the reinforcing composite may not change by more than 5%, 10%, 15%, 20%, 30%, 40%, 50%, 100%, 200%, 300%, 400% or 500% over the course of its length.

The reinforcing composite comprises a conductive additive and this means that the composite can provide a conductive path between the first fluid-carrying member and the second fluid-carrying member. The conductive additive may be present in the resin mixture in an amount up to or at least 30%, 20%, 10%, 5%, 2% or 1% of the resin mixture by weight or volume. The resin and/or fibre may be present in the reinforcing composite in an amount up to or at least 30%, 40%, 50%, 60%, 70%, 80% or 90% of the reinforcing composite by weight or volume.

The reinforcing composite may directly contact the first fluid-carrying member and the second fluid-carrying member. Alternatively, a surface treatment, for example a conductive surface treatment, may be provided on or applied to the first fluid-carrying member and/or the second fluid-carrying member and the reinforcing composite may contact this surface treatment, whilst still encircling the first fluid-carrying member and the second fluid-carrying member.

The first fluid-carrying member may terminate in a first end or shoulder portion that abuts a first end of the resistive, semi-conductive or non-conductive component, and the second fluid-carrying member may terminate in a second end or shoulder portion that abuts a second end of the resistive, semi-conductive or non-conductive component; and the first and second shoulder portions may change, taper, increase or immediately increase from a relatively small thickness and/or outer diameter to a relatively large thickness and/or outer diameter when moving towards the resistive, semi-conductive or non-conductive component.

The reinforcing composite may extend axially past each of the tapered portions of the first and second shoulder portions, when moving in a direction away from the resistive, semi-conductive or non-conductive component. This can provide a secure structure that holds captive the first fluid-carrying member, second fluid-carrying member and resistive, semi-conductive or non-conductive component.

The reinforcing composite may encase or enclose the shoulder portions of the first and second fluid-carrying members, as well as the resistive, semi-conductive or non-conductive component. The reinforcing composite may extend axially past the first and/or second ends of the resistive, semi-conductive or non-conductive component.

The first shoulder portion may comprise an annular flange that is located within or over a cooperating annular flange on the first end of the resistive, semi-conductive or non-conductive component. The second shoulder portion may comprises an annular flange that is located within or over a cooperating annular flange on the second end of the resistive, semi-conductive or non-conductive component.

The cooperating annular flanges can provide a useful interlocking arrangement and further structural rigidity, when combined with the reinforcing composite that encircles the various parts.

The electrical isolator may further comprise one or more first seals located between the cooperating annular flanges of the first shoulder portion and the first end of the resistive, semi-conductive or non-conductive component. The electrical isolator may further comprise one or more second seals located between the cooperating annular flanges of the second shoulder portion and the second end of the resistive, semi-conductive or non-conductive component.

Locating the seals between the interlocking annular flanges can provide the optimum location at which to seal the assembly. The dimensions of the annular flanges of the first and second shoulder portions may such that the one or more first and second seals are pressed against the opposing flange when assembled.

The one or more first and second seals may be configured to fluidly seal the resistive, semi-conductive or non-conductive component to the first fluid-carrying member and the second fluid-carrying member.

The first fluid-carrying member and/or second fluid-carrying member and/or resistive, semi-conductive or non-conductive component and/or reinforcing composite may be tubular. The first fluid-carrying member and/or second fluid-carrying member and/or resistive, semi-conductive or non-conductive component and/or reinforcing composite may each have substantially the same cross-section, for example circular cross-section.

Alternatively, the first fluid-carrying member and/or second fluid-carrying member and/or resistive, semi-conductive or non-conductive component and/or reinforcing composite may each have other shapes and cross-sections, such as a square, rectangular, triangular or irregular cross-section.

The diameter of the first fluid-carrying member and/or second fluid-carrying member and/or resistive, semi-conductive or non-conductive component and/or reinforcing composite may be at least or no more than 5 mm, 10 mm, 15 mm, 20 mm, 25 mm, 30 mm, 35 mm, 40 mm, 45 mm, 50 mm, 60 mm, 70 mm, 80 mm, 90 mm or 100 mm.

The thickness of the first fluid-carrying member and/or second fluid-carrying member and/or resistive, semi-conductive or non-conductive component and/or reinforcing composite may be at least or no more than 1 mm, 2 mm, 3 mm, 4 mm, 5 mm or 10 mm.

The first fluid-carrying member, the second fluid-carrying member and the resistive, semi-conductive or non-conductive component may have a substantially constant internal diameter. This can reduce the amount of sloshing that fluid experiences as it travels through the isolator, in turn reducing build-up of static charge.

The first fluid-carrying member and/or the second fluid-carrying member may comprise one or more protrusions on an outer surface thereof, and the reinforcing composite may extend over and enclose, encase or cover the one or more protrusions. The one or more protrusions may be annular or irregular.

The first fluid-carrying member and the second fluid-carrying member may be metallic.

The first fluid-carrying member, the second fluid-carrying member, and the resistive, semi-conductive or non-conductive component may be coaxial with one another.

The fibre may comprise glass fibre, carbon fibre or aramid fibres.

The conductive additive may comprise carbon black or carbon nanotubes.

The resin mixture may comprise a resin that may be of thermoset (e.g. epoxy) or thermoplastic (e.g. polyether ether ketone—"PEEK") construction.

It is envisaged that the material between the various parts of the electrical isolator described above, for example between the reinforcing composite and the first fluid-carrying member and/or second fluid-carrying member and/or resistive, semi-conductive or non-conductive component, will be minimal, and may only comprise materials, e.g. surface treatments of nominal thickness, for example not exceeding a thickness of 5 mm, 2 mm, 1 mm, 0.5 mm or 0.25 mm.

No air gap or other material may be present between the reinforcing composite and the first fluid-carrying member, the second fluid-carrying member and the resistive, semi-conductive or non-conductive component.

The electrical isolator may consist of, or consist essentially of the first fluid-carrying member, the second fluid-carrying member, the resistive, semi-conductive or non-conductive component and the one or more first and second seals, and optionally any surface treatments provided on or applied to the first fluid-carrying member and/or the second fluid-carrying member.

By "consist essentially of", it is meant that the electrical isolator consists only of those parts described, but also including materials of nominal thickness or volume, such as surface treatments.

In accordance with an aspect of the disclosure, there is provided a hydraulic system or hydraulic fluid line, for example in an aircraft, comprising an electrical isolator as described above. It has been found that the technology disclosed herein is particularly suitable for electrically isolating components under a high pressure, for example that experienced in a hydraulic system, such as greater than 1000, 2000 or 3000 psi.

BRIEF DESCRIPTION OF THE DRAWINGS

Various embodiments will now be described, by way of example only, and with reference to the accompanying drawings in which:

FIG. 1 shows a cross-section of an electrical isolator in accordance with an embodiment of the present disclosure.

DETAILED DESCRIPTION

The present disclosure relates to electrical isolators, which may be used in aircraft hydraulic systems or hydraulic fluid lines in order to provide a strong fluid carrying structure whilst controlling induced electric current (e.g. by lightning) and dissipation of electrostatic charge.

FIG. 1 shows a cross-section of an electrical isolator or fluid carrying element 10 according to an embodiment of the present disclosure.

The electrical isolator 10 forms part of a fluid conveying network, such as a hydraulic fluid network in an aircraft. Fluid, for example hydraulic fluid, may flow through the electrical isolator 10 in the direction of arrow 100.

The electrical isolator 10 comprises a first pipe 12 and a second pipe 14. Both the first pipe 12 and the second pipe 14 may be metallic. In the illustrated example the first pipe 12 and the second pipe 14 have the same structure. The first and second pipes 12,14 are opposed and spaced apart from one another to provide a gap therebetween.

In the illustrated embodiment the first pipe 12 and second pipe 14 are tubular, i.e. cylindrical in shape and having a circular cross-section. Other shapes and cross-sections are possible. Whilst in FIG. 1 the first pipe 12 and second pipe 14 are shown as coaxial, this is not essential and embodiments are envisaged in which the axes of the first pipe 12 and second pipe 14 are at an angle with respect to each other. The angle may be less than 90, 60, 30, 15, 10 or 5 degrees, for example.

Both the first pipe 12 and the second pipe 14 terminate in a shoulder portion 11. The shoulder portion 11 has an increased outer diameter and/or thickness compared to the portion of the respective pipe 12, 14 that is adjacent to it. The shoulder portion 11 comprises a radial surface 15 and an annular flange 13 extending axially from the radial surface 15. Each annular flange 13 terminates at a respective radial surface 17.

A resistive, semi-conductive or non-conductive component or liner 16 is located between the first pipe 12 and the second pipe 14. The liner 16 connects the first pipe 12 to the second pipe 14 and maintains a fluid path (see arrow 100) therebetween. The liner is shown as tubular in FIG. 1, and coaxial with the first pipe 12 and second pipe 14. Other configurations are possible, for example if the axes of the first pipe 12 and second pipe 14 are at an angle with respect to each other as discussed above. The liner 16 is resistive, semi-conductive or non-conductive such that it does not itself conduct or transfer electric current between the first pipe 12 and the second pipe 14.

Each axial end of the liner 16 comprises a radial surface 19 and an annular flange 18 extending axially from the radial surface 19. The annular flanges 18 of the liner 16 terminate at radial surfaces 20.

The respective flanges 13 of the first pipe 12 and second pipe 14 are configured to fit and/or slide into respective flanges 18 of the liner 16. Alternatively, the respective flanges 18 of the liner 16 may be configured to fit and/or slide into the respective flanges 13 of the first pipe 12 and the second pipe 14. As such, the radial surfaces 17 of the first pipe 12 and second pipe 14 contact and oppose the radial surfaces 19 of the liner 16. Similarly, the radial surfaces 15 of the shoulder portion 11 contact and oppose the radial surfaces 20 of the annular flanges 18 of the liner 16.

The inner diameter of the liner 16 may be the same as that of the first pipe 12 and the second pipe 14. This can assist in reducing disturbances to fluid flowing through the electrical isolator 10.

The shoulder portions 11 of the first pipe 12 and/or second pipe 14 may be shaped so as to taper from a relatively small outer diameter to a relatively large outer diameter, when moving towards the end of the respective pipe 12, 14 (or towards the liner 16). The shoulder portions 11 thus comprise a ramp whose outer diameter increases when moving towards the end of the respective pipe 12, 14 (or towards the liner 16). The ramp may terminate at the radial surface 15, which may define the point at which the shoulder portions 11 have the largest outer diameter.

The outer diameter of the liner 16 may be the same as that of the shoulder portions 11 of the first pipe 12 and second pipe 14, for example where the ramp terminates at the radial surface 15. This creates a smooth transition from the outer surface of the liner 16 to the outer surface of the first pipe 12 and second pipe 14.

The liner 16 is fluidly sealed against both the first pipe 12 and the second pipe 14 using one or more sealing members 25. In the illustrated embodiment, the sealing members 25 are annular "O" rings and two are provided for sealing each of the first pipe 12 and the second pipe 14. The annular rings sit within respective grooves on the annular flanges 13 of the first pipe 12 and second pipe 14. It would be possible to use other amounts or types of seal and in other arrangements, for example provide the grooves on the annular flanges 18 of the liner 16 instead.

In accordance with the present disclosure, a reinforcing composite 30 is located around the first pipe 12, the second pipe 14 and the liner 16. The reinforcing composite comprises fibre and a resin mixture. The fibre may be glass fibre, carbon fibre or aramid fibre. The resin mixture may comprise a resin that may be of thermoset (e.g. epoxy) or thermoplastic (e.g. polyether ether ketone—"PEEK") construction.

The reinforcing composite 30 may consist of, or consist essentially of the fibre and resin mixture. The reinforcing composite 30 may be continuous and cover all of the first pipe 12, second pipe 14 and liner 16 with no air gap and/or other material in between. The first pipe 12 and second pipe 14 may comprise a surface coating or treatment, and the surface coating or treatment may be the only material between the first pipe 12 or second pipe 14 and the reinforcing composite 30.

The reinforcing composite 30 extends axially past the shoulder portions 11 of the first pipe 12 and the second pipe 14. As such, the internal diameter of the reinforcing composite 30 decreases as the reinforcing composted 30 extends over and hugs the tapering surface of the first and second pipes 12,14 at the shoulder portion 11.

Due to the reinforcing composite 30 extending axially past the shoulder portion 11, the smallest internal diameter of the reinforcing composite 30 (i.e. past the shoulder portion 11) may be less than the largest outer diameter of the first pipe 12 and the second pipe 14 (i.e. at the shoulder portion 11). In this manner, the first pipe 12, second pipe 14 and the liner 16 may be held captive by the reinforcing composite 30.

Alternatively, or additionally the shoulder portion 11 of the first pipe 12 and/or the second pipe 14 may comprise a protrusion, over which the reinforcing composite extends.

The resin mixture comprises a conductive additive, for example carbon black and/or carbon nanotubes, and this can be incorporated into the resin mixture in varying amounts to achieve the desired conductivity for a particular application.

Alternatively, or additionally the desired conductivity could be achieved by varying the amount of fibre or resin mixture in the composite 30. It will be appreciated that the conductivity of the composite 30 is a function of the relative amounts of fibre, resin and additive and these amounts could be varied to provide any desired conductivity. The conductive additive may be present in the resin mixture in an amount between 0-10 wt. %.

The features discussed above provide an electrical isolator achieving a balance of controlling electric current and dissipating electric charge, whilst also being capable of withstanding high pressures. The issue of high fluid pressure is particularly important when incorporating an electrical isolator in a hydraulic fluid line, for example that of an aircraft, which typically operate at a higher pressure, for example greater than 3000 psi, than for example fuel lines, which operate at pressures of about 100 psi.

This can be used in pressurised fluid systems that require controlled electrical resistance. The electrical isolators described herein achieve robust static sealing, resilience to fatigue, electrical continuity.

Use of a conductive reinforcing composite as disclosed herein removes the need for conductive leads that are exhibited in conventional arrangements. At the same time, the arrangements of the present disclosure remove the need for adhesive and surface preparation, unlike adhered bonds which can be hard to manufacture. Using a conductive additive in the resin also means that the resistivity (or conductivity) of the electrical isolator can be tuned during production, by simply varying the amount of conductive additive in the resin.

A method of forming the electrical isolator 10 of FIG. 1 will now be described.

The first pipe 12 and the second pipe 14 may be provided. The first pipe 12 and/or second pipe 14 may form part of a pipe network, or each comprise the end portion of a larger pipe. The electrical isolator 10 may be part of a hydraulic pipe network operating at greater than 1000, 2000 or 3000 psi, for example a hydraulic system or hydraulic fluid pipe in an aircraft.

Ring seals 25 are inserted into respective grooves on the first pipe 12 and second pipe 14. The ends of the first pipe 12 and the second pipe 14 may then be brought close to one another, and the resistive, semi-conductive or non-conductive component or liner 16 may be placed therebetween. The annular flanges 13 of the first pipe 12 and second pipe 14 may be inserted into (or over) the corresponding annular flanges 18 of the liner 16. This forms a connection between the first pipe 12 and the second pipe 14.

Due to the presence of seals 25, the liner 16 is fluidly sealed against the first pipe 12 and the second pipe 14. This allows fluid to flow or be conveyed from the first pipe 12 to the second pipe 14.

In order to provide reinforcement, a reinforcing composite 30 is located around the first pipe 12, the second pipe 14 and the liner 16. The composite 30 may be continuous and contact all of the first pipe 12, second pipe 14 and the liner 16.

To form the composite 30, a fibre (e.g. a glass fibre) may be drawn through a bath containing the resin mixture, and then the fibre and resin mixture may be wound around the first pipe 12, liner 16, and second pipe 14 until the fibre and resin mixture composite exhibits a sufficient thickness and covers all of the first pipe 12, second pipe 14 and liner 16. The orientation of the fibres may be controlled, for example using an automated layup method. As discussed above, the resin mixture comprises a conductive additive. This can be added and mixed into the resin contained in the bath in varying amounts, to alter or change the conductivity of the composite 30.

The composite 30 may also be formed using a fibre material that has been impregnated with a resin, rather than drawing the resin through a resin bath as described above.

The glass fibre and resin mixture is cured to form the reinforcing composite 30 that is located around and contacts the first pipe 12, second pipe 14 and liner 16. Once cured, the reinforcing composite acts to hold the components of the electrical insulator 10 together to provide strength and resistance when high pressure fluids are passed through the electrical insulator 10.

The method may further comprise passing fluid through the electrical isolator 10, i.e. from the first pipe 12 to the second pipe 14 via the liner 16, at a pressure of greater than 1000, 2000 or 3000 psi.

Although the present disclosure has been described with reference to various embodiments, it will be understood by those skilled in the art that various changes in form and detail may be made without departing from the scope of the disclosure as set forth in the accompanying claims.

The invention claimed is:

1. An electrical isolator comprising:
   a first fluid-carrying member and a second fluid-carrying member spaced apart from said first fluid-carrying member;
   a resistive, semi-conductive or non-conductive component located between and sealed against said first and second fluid-carrying member, wherein said resistive, semi-conductive or non-conductive component is adapted to convey fluid flowing from said first fluid-carrying member to said second fluid-carrying member;
   a reinforcing composite encircling said first fluid-carrying member, said second fluid-carrying member and said resistive, semi-conductive or non-conductive component, wherein said reinforcing composite is continuous and provides a conductive path between said first fluid-carrying member and said second fluid-carrying member;
   wherein said reinforcing composite comprises fibre and a resin mixture, and said resin mixture comprises resin and a conductive additive;
   wherein:

said first fluid-carrying member terminates in a first shoulder portion that abuts a first end of said resistive, semi-conductive or non-conductive component, and said second fluid-carrying member terminates in a second shoulder portion that abuts a second end of said resistive, semi-conductive or non-conductive component; and said first and second shoulder portions taper from a relatively small thickness and/or outer diameter to a relatively large thickness and/or outer diameter when moving towards said resistive, semi-conductive or non-conductive component.

2. An electrical isolator as claimed in claim 1, wherein said reinforcing composite extends axially past each of said tapered portions of said first and second shoulder portions when moving in a direction away from the resistive, semi-conductive or non-conductive component.

3. An electrical isolator as claimed in claim 1, wherein:

said first shoulder portion comprises an annular flange that is located within or over a cooperating annular flange on said first end of said resistive, semi-conductive or non-conductive component; and said second shoulder portion comprises an annular flange that is located within or over a cooperating annular flange on said second end of said resistive, semi-conductive or non-conductive component.

4. An electrical isolator as claimed in claim 3, further comprising:

one or more first seals located between said cooperating annular flanges of said first shoulder portion and said first end of said resistive, semi-conductive or non-conductive component, and one or more second seals located between said cooperating annular flanges of said second shoulder portion and said second end of said resistive, semi-conductive or non-conductive component;

wherein said one or more first and second seals are configured to fluidly seal said resistive, semi-conductive or non-conductive component to said first fluid-carrying member and said second fluid-carrying member.

5. An electrical isolator as claimed in claim 1, wherein said first fluid-carrying member, said second fluid-carrying member and said resistive, semi-conductive or non-conductive component are tubular and have a substantially constant internal diameter.

6. An electrical isolator as claimed in claim 1, wherein said first fluid-carrying member and/or said second fluid-carrying member comprises one or more protrusions on an outer surface thereof, and said reinforcing composite extends over said one or more annular protrusions.

7. An electrical isolator as claimed in claim 1, wherein said first fluid-carrying member and said second fluid-carrying member are metallic.

8. An electrical isolator as claimed in claim 1, wherein said first fluid-carrying member, said second fluid-carrying member, and said resistive, semi-conductive or non-conductive component are coaxial with one another.

9. An electrical isolator as claimed in claim 1, wherein said fibre comprises glass fibre, carbon fibre or aramid fibres.

10. An electrical isolator as claimed in claim 1, wherein said conductive additive comprises carbon black or carbon nanotubes.

11. An electrical isolator as claimed in claim 1, wherein no air gap or other material is present between said reinforcing composite and said first fluid-carrying member, said second fluid-carrying member and said resistive, semi-conductive or non-conductive component.

12. A hydraulic system in an aircraft comprising an electrical isolator as claimed in claim 1.

* * * * *